(12) United States Patent
Ito et al.

(10) Patent No.: US 12,434,576 B2
(45) Date of Patent: Oct. 7, 2025

(54) POWER SUPPLY CONTROL DEVICE, POWER SUPPLY CONTROL PROGRAM, AND POWER SUPPLY CONTROL SYSTEM

(71) Applicant: TOYOTA JIDOSHA KABUSHIKI KAISHA, Toyota (JP)

(72) Inventors: Masaki Ito, Toyota (JP); Yuki Takahashi, Susono (JP); Sakiko Yoshida, Mishima (JP); Kizuku Yamada, Susono (JP); Yoshimasa Watanabe, Sunto-gun (JP); Tomonori Imamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 926 days.

(21) Appl. No.: 17/559,196

(22) Filed: Dec. 22, 2021

(65) Prior Publication Data

US 2022/0234453 A1 Jul. 28, 2022

(30) Foreign Application Priority Data

Jan. 22, 2021 (JP) .................. 2021-009012

(51) Int. Cl.
*B60L 53/00* (2019.01)
(52) U.S. Cl.
CPC .................. *B60L 53/00* (2019.02)

(58) Field of Classification Search
CPC .......... B60L 53/00; B60L 53/10; B60L 53/60; B60L 53/66; B60L 53/68
See application file for complete search history.

(56) References Cited

U.S. PATENT DOCUMENTS

| 11,932,134 B2 * | 3/2024 | Dunjic | G07F 15/005 |
| 2022/0234453 A1 * | 7/2022 | Ito | B60L 53/00 |

FOREIGN PATENT DOCUMENTS

| CN | 111071075 A | * | 4/2020 | ............. B60L 53/10 |
| CN | 111483454 A | * | 8/2020 | ............. B60K 6/445 |
| JP | 2010119246 A | * | 5/2010 | ............. B60L 53/12 |
| JP | 2015228789 A | * | 12/2015 | ............ B60L 11/182 |
| JP | 2018-092398 A | | 6/2018 | |
| JP | 2018142063 A | * | 9/2018 | |
| JP | 2019-008339 A | | 1/2019 | |
| JP | 2020064572 A | * | 4/2020 | ............. B60L 53/10 |
| JP | 2021107951 A | * | 7/2021 | |
| KR | 20230086082 A | * | 6/2023 | ............. B60L 58/12 |

* cited by examiner

*Primary Examiner* — Jason C Smith
(74) *Attorney, Agent, or Firm* — Oliff PLC (57) ABSTRACT

A power supply control device according to the present disclosure includes a processor that generates control information for preferentially supplying electric power to a wide traveling lane when information on a disaster is acquired in a plurality of traveling lanes in which a vehicle travels in the same direction, each of the traveling lanes having a different width.

15 Claims, 6 Drawing Sheets

POWER SUPPLY CONTROL DEVICE, POWER SUPPLY CONTROL PROGRAM, AND POWER SUPPLY CONTROL SYSTEM

CROSS-REFERENCE TO RELATED APPLICATION

This application claims priority to Japanese Patent Application No. 2021-009012 filed on Jan. 22, 2021, incorporated herein by reference in its entirety.

BACKGROUND

1. Technical Field

The present disclosure relates to a power supply control device, a power supply control program, and a power supply control system.

2. Description of Related Art

Japanese Unexamined Patent Application Publication No. 2019-008339 (JP 2019-008339 A) discloses that a power supply facility is controlled such that, in the event of a disaster, an emergency vehicle can preferentially use the power supply facility among vehicles capable of traveling in a hybrid traveling mode or an electric vehicle (EV) traveling mode.

SUMMARY

A plurality of traveling lanes in which a vehicle travels in the same direction, each of the traveling lanes having a different lane width, may be installed. It is assumed that emergency vehicles or public vehicles such as large vehicles for transportation travel in a wide traveling lane of the traveling lanes, for example. These public vehicles are required to travel while charging a battery and move to a disaster area even in the event of a disaster.

The present disclosure has been made in view of the above, and an object of the present disclosure is to provide a power supply control device, a power supply control program, and a power supply control system capable of maintaining a state in which a public vehicle can travel in the event of a disaster or the like.

A power supply control device according to the present disclosure includes a processor that generates control information for preferentially supplying electric power to a wide traveling lane when information on a disaster is acquired in a plurality of traveling lanes in which a vehicle travels in the same direction, each of the traveling lanes having a different width.

A power supply control program according to the present disclosure causes a processor to execute generating control information for preferentially supplying electric power to a wide traveling lane when information on a disaster is acquired in a plurality of traveling lanes in which a vehicle travels in the same direction, each of the traveling lanes having a different width.

Further, a power supply control system according to the present disclosure includes a plurality of traveling lanes in which a vehicle travels in the same direction, each of the traveling lanes having a different width, and a power supply control device including a first processor that generates control information for preferentially supplying electric power to a wide traveling lane when information on a disaster is acquired.

According to the present disclosure, it is possible to maintain a state in which public vehicles can travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings. In all the drawings of the following embodiment, the same or corresponding portions are designated by the same reference signs. Further, the present disclosure is not limited to the embodiment described below.

Embodiment

Figure 1:
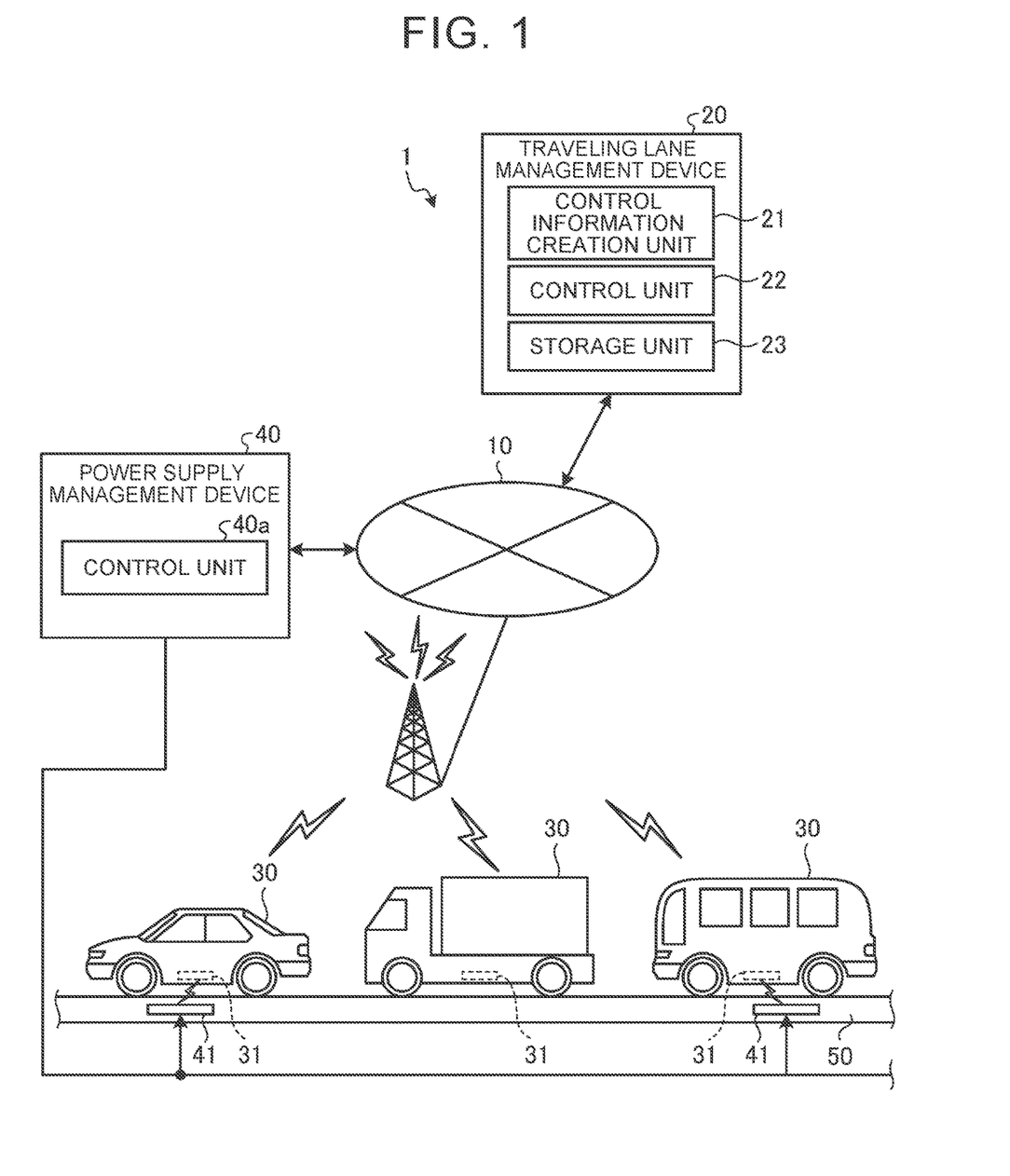
FIG. 1 is a schematic view showing a power supply control system according to an embodiment.
Figure 2:
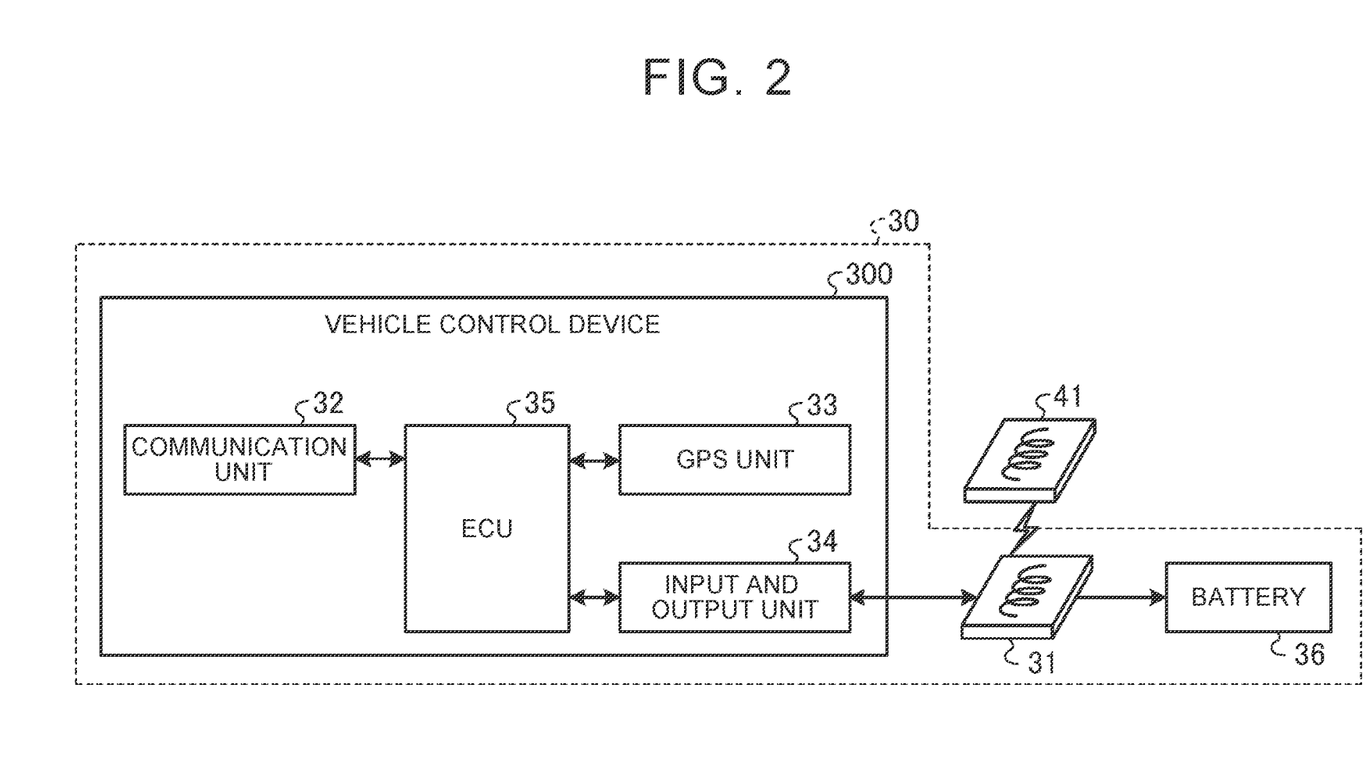
FIG. 2 is a block diagram illustrating a configuration of a vehicle (vehicle control device) according to the embodiment.
Figure 3:
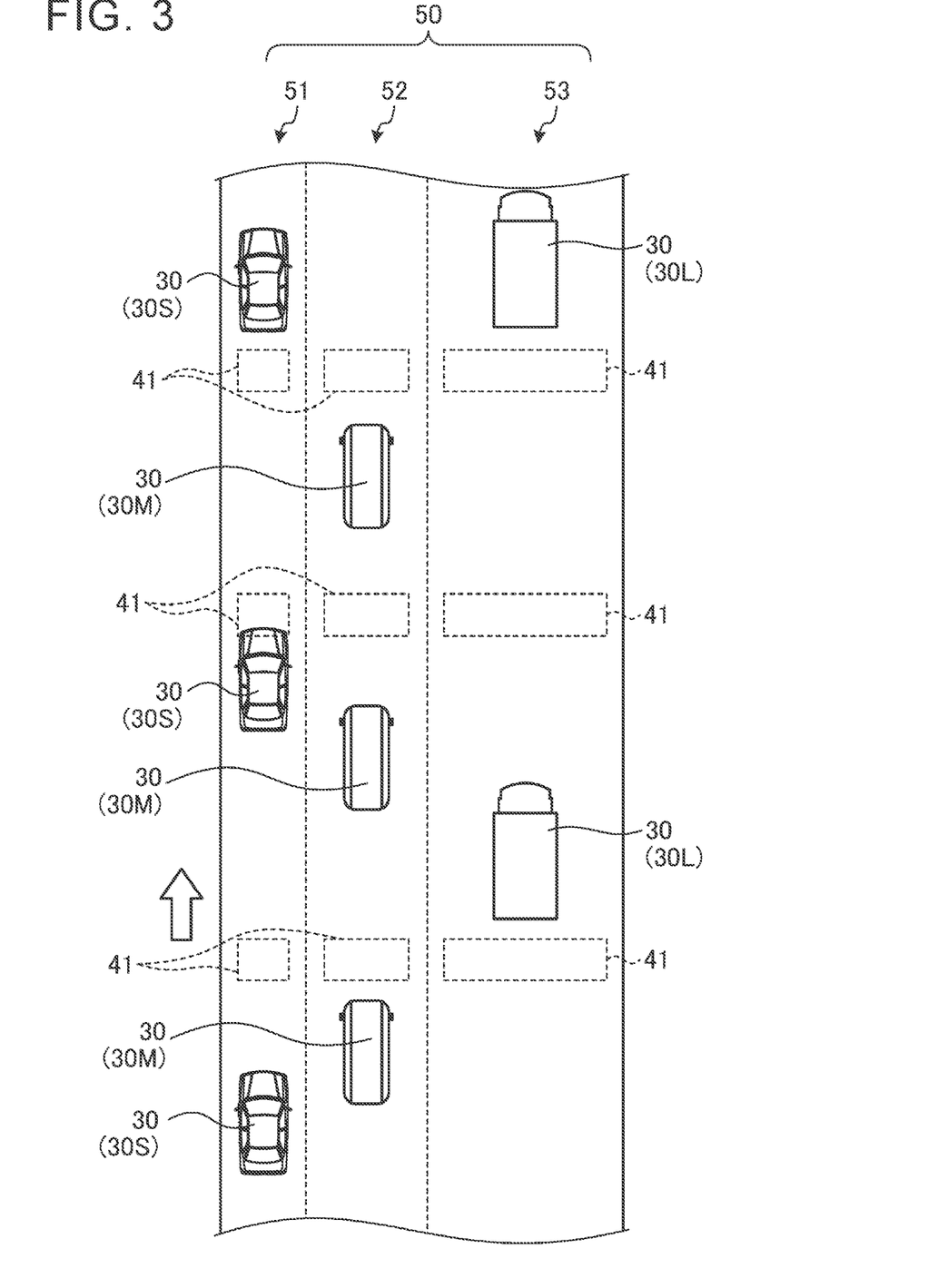
FIG. 3 is a diagram showing an example of the vehicle and traveling lanes in the power supply control system according to the embodiment.

First, a power supply control system according to an embodiment will be described. FIG. 1 is a schematic view showing the power supply control system including a power supply management device according to the embodiment. FIG. 2 is a block diagram illustrating a configuration of a vehicle (vehicle control device) according to the embodiment. FIG. 3 is a diagram showing an example of the vehicle and traveling lanes in the power supply control system according to the embodiment.

As shown in FIG. 1, a power supply control system 1 according to the embodiment includes a traveling lane management device 20, vehicles 30, and a power supply management device 40. In the power supply control system 1 according to the embodiment, the traveling lane management device 20, each vehicle 30, and the power supply management device 40 are connected to each other by a network 10 so as to be able to communicable with each other. The network 10 is composed of an Internet line network, a mobile phone line network, and the like by which the traveling lane management device 20, the vehicle 30, and the power supply management device 40 can communicate with each other. In the present embodiment, the vehicle 30 is assumed to be a vehicle capable of traveling in a hybrid traveling mode or an electric vehicle (EV) traveling mode. The vehicle 30 is charged with electric power supplied from a power supply device 41 managed by the power supply management device 40.

The traveling lane management device 20 controls formation of the vehicles 30 traveling in the traveling lane, and transmits information for controlling a power supply mode in the traveling lane to the power supply management device 40. The traveling lane management device 20 includes a control information creation unit 21, a control unit 22, and a storage unit 23. The traveling lane management device 20 is configured using one or a plurality of computers including a central processing unit (CPU), a field programmable gate array (FPGA), a read only memory (ROM), a random access memory (RAM), and the like. The traveling lane management device 20 corresponds to a traveling control device.

The control information creation unit 21 creates traveling lane control information for controlling power supply in the traveling lane based on the received information related to a disaster.

The control unit 22 comprehensively controls an operation of each unit of the traveling lane management device 20.

The storage unit 23 is configured using a computer-readable recording medium, and various programs and various data are stored in a writable and readable manner. The recording medium includes a storage medium such as an optical disk, a flash memory, and a magnetic disk, and a drive device for these storage media.

Further, the storage unit 23 stores power supply control information used when the control information creation unit 21 creates the control information. This power supply control information includes a power supply ratio assigned to each traveling lane in the normal state and in the event of a disaster. The term "normal" as used herein refers to a state in which traveling of the vehicle 30 is not hindered by an accident, disaster, or the like. The power supply ratio is, for example, a ratio of the electric power assigned with respect to the total electric power capable of being supplied to traveling lanes to be supplied with the electric power. In the normal state, the same ratio is set for each traveling lane, and in the event of a disaster, the ratio is set according to a width of a traveling lane. The power supply ratio in the event of a disaster is set such that electric power is preferentially supplied to a traveling lane as the size of the vehicle 30 that travels in the traveling lane is large.

In the present embodiment, non-contact charging is performed between the vehicle 30 and the power supply device 41. A receiving unit 31 provided in the vehicle 30 communicates with the power supply device 41 connecting to the power supply management device 40 so as to transmit a power supply signal to the vehicle 30. The receiving unit 31 and the power supply device 41 are each configured using, for example, a coil, a switching circuit, and a rectifying and smoothing circuit, and transmit and receive the power supply signal by a magnetic field resonance method. With this configuration, the vehicle 30 and the power supply device 41 communicate with each other in a non-contact state. The power supply device 41 preferably extends along the traveling lane in order to lengthen a power supply section. In the present embodiment, an example in which electric power is supplied and information is transmitted using electromagnetic waves will be described. However, a configuration in which electric power is supplied and information is transmitted using light may be adopted. Further, the receiving unit 31 may not accept an input of the power supply signal when the remaining charge of the battery of the vehicle 30 has reached the upper limit value. The remaining charge is, for example, a state of charge (SOC).

The power supply device 41 is provided in a plurality of lanes (traveling lanes) in which the vehicle travels, and is electrically connected to the power supply management device 40. Further, in the present embodiment, the power supply device 41 may have a detection function that detects the vehicle 30 located on the power supply device 41 and a reception function that receives information on the vehicle 30. The detection function and the reception function are configured using, for example, a loop antenna. For example, the detection function transmits a detection signal to the power supply management device 40 when the vehicle 30 is detected. Note that, when the vehicle can be detected by a power supply coil or the like, the coil may be used for detection in common with power supply.

Subsequently, the configuration of the vehicle 30 will be described with reference to FIG. 2. The vehicle 30 includes a receiving unit 31, a communication unit 32, a global positioning system (GPS) unit 33, an input and output unit 34, and an electronic control unit (ECU) 35. Further, the vehicle 30 is provided with a battery 36 that supplies electric power to each portion. The battery 36 is configured to be rechargeable. In the present embodiment, a vehicle control device 300 is configured by the communication unit 32, the GPS unit 33, the input and output unit 34, and the ECU 35. The vehicle control device 300 is configured using one or a plurality of computers, etc. including a CPU, FPGA, ROM, RAM, and the like.

The receiving unit 31 receives the power supply signal from the power supply device 41. The receiving unit 31 may be configured to acquire energy from the power supply device 41 such as light, or may transmit its own information to the power supply device 41 using the electromagnetic wave. The receiving unit, the acquiring unit, and the transmitting unit may be provided separately instead of being integrated. The power supply signal received by the receiving unit 31 is supplied to the battery 36 as electric power.

The communication unit 32 communicates with the traveling lane management device 20 by wireless communication via the network 10. The communication unit 32 receives driving support information for supporting driving of the vehicle 30 from the traveling lane management device 20. The driving support information includes road traffic information such as regulations and traffic jams. Further, the communication unit 32 may be configured to transmit its own information to the power supply management device 40.

The GPS unit 33 receives radio waves from GPS satellites and detects the position of the vehicle 30. The detected position is output to the outside (traveling lane management device 20) or stored in the storage unit as the position information of the vehicle 30.

The input and output unit 34 is composed of a touch panel display, a speaker, a microphone, etc. The input and output unit 34 is configured to be able to input and output predetermined information such as information related to driving support by displaying characters, figures, etc. on the screen of the touch panel display or outputting sound from the speaker in accordance with the control by the ECU 35. Further, the input and output unit 34 is configured to be able to input predetermined information to the ECU 35 when a user of the vehicle 30 or the like operates the touch panel display or outputs a voice toward the microphone.

The ECU 35 is composed of an information processing device such as a microcomputer including a CPU, FPGA, ROM, RAM, and the like. The ECU 35 comprehensively controls the electrical operation of each portion of the vehicle 30. The ECU 35 is configured to perform calculation using input data and data and a program stored in advance, and output the calculation result as a control command signal.

Note that, the vehicle 30 includes storage media such as a hard disk and a semiconductor memory, a storage unit including a drive device for these storage media, a sensor for detecting an object approaching the vehicle 30, and the like. The storage unit stores programs of an operating system (OS) and various applications necessary for the ECU 35 to comprehensively control the operation of each portion of the vehicle 30.

Further, the vehicle 30 is provided with a control mechanism and an operation mechanism for driving the vehicle 30. Specifically, the vehicle 30 includes a powertrain and drive wheels as a drive mechanism. The powertrain includes a power source that generates a driving force and outputs the generated driving force from an output shaft, and a power transmission mechanism that transmits the driving force output by the power source to the drive wheels. Further, the operation mechanism is composed of a shift lever, an accelerator pedal, and the like.

The power supply management device 40 is connected to the power supply device 41, receives information acquired from each vehicle 30 by the power supply device 41, and controls power supply to the vehicle 30 based on the received information. The power supply management device 40 is configured using one or a plurality of computers, etc. including a CPU, FPGA, ROM, RAM, and the like.

Further, the power supply management device 40 includes a control unit 40a. The control unit 40a comprehensively controls an operation of each unit of the power supply management device 40. The control unit 40a controls power supply to the power supply device 41 installed in each traveling lane based on the control information acquired from the traveling lane management device 20.

Here, in the present embodiment, a road 50 including traveling lanes in which the vehicle 30 travels in the same direction will be described as an example. The road 50 includes a first traveling lane 51, a second traveling lane 52, and a third traveling lane 53, and the widths of the traveling lanes are different from each other. The width described here refers to a length in a traveling direction of the vehicle 30 and in a direction orthogonal to a longitudinal direction of the traveling lane. Specifically, the first traveling lane 51, the second traveling lane 52, and the third traveling lane 53 are arranged in numerical order from left to right, and the width of the lane increases in the order of the first traveling lane 51, the second traveling lane 52, and the third traveling lane 53. The relationship of the widths shown in FIG. 3 is an example, and the width of the lane is set according to the scale of the road 50 and the vehicle 30 that travels in the lane. In the normal state, the vehicle 30 travels in each traveling lane, regardless of vehicle types. The vehicle types are broadly classified into emergency vehicles and other vehicles. The emergency increases as the public nature of medical care, transportation of goods, etc. increases. Further, a small size, a medium size, a large size, etc. of the vehicle 30 are classified in accordance with the weight of the vehicle 30 (including the loadable weight). In the present embodiment, emergency vehicles are classified as large vehicles. In FIG. 3, for example, a large-sized vehicle 30 is 30L, a medium-sized vehicle 30 is 30M, and a small-sized vehicle 30 is 30S.

A plurality of the power supply devices 41 is provided at preset intervals in each traveling lane. The power supply devices 41 are provided, for example, at intervals of several kilometers (km). Although FIG. 3 shows an example in which an installation area of the power supply device 41 is smaller (shorter) than the vehicle 30, the installation area can be made longer than the vehicle 30 or the power supply devices 41 are disposed adjacent to each other and the power supply range can be adjusted.

Figure 4:
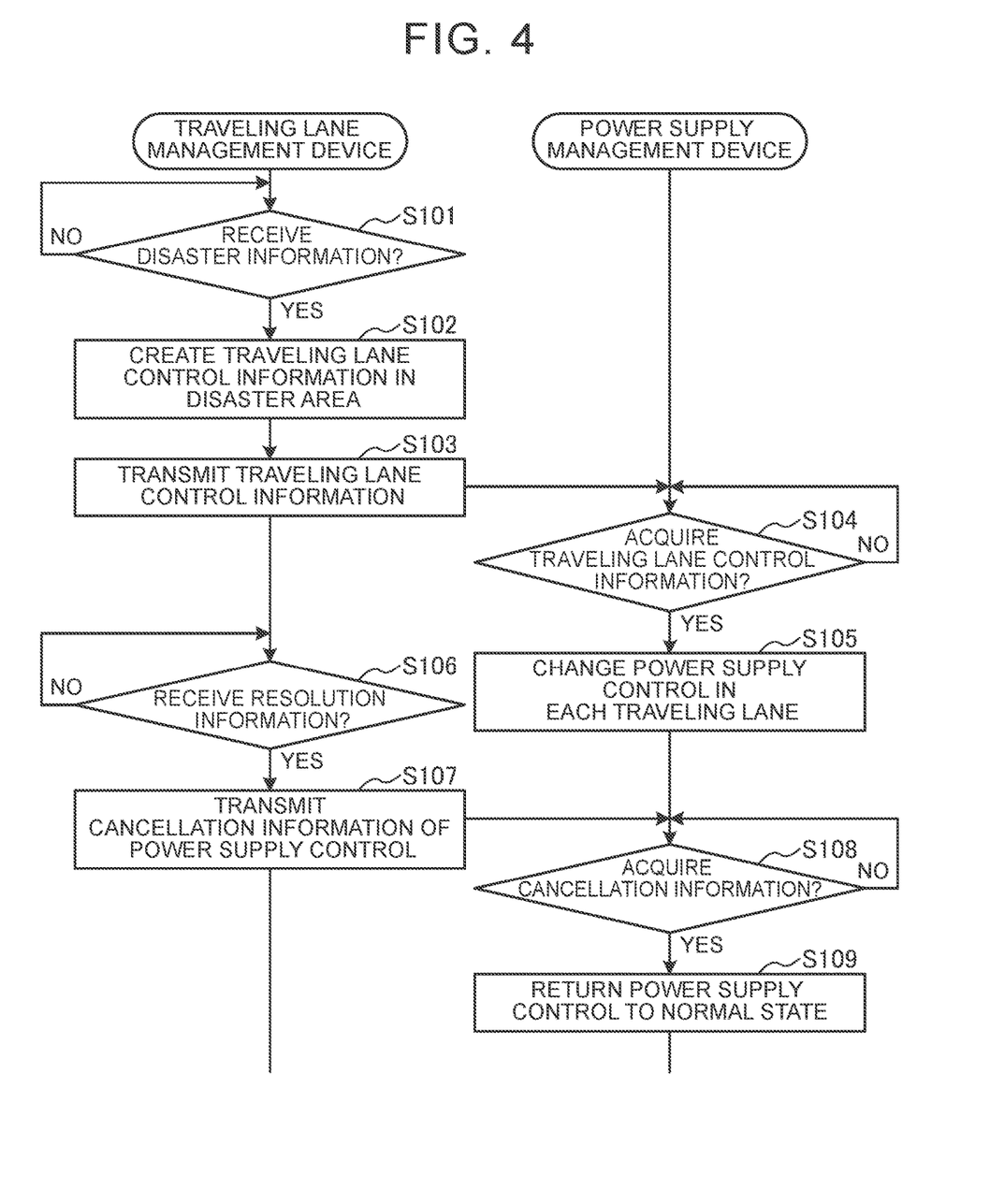
FIG. 4 is a sequence diagram illustrating a power supply control process executed by the power supply control system according to the embodiment.

Subsequently, a traveling control process executed by the power supply control system 1 will be described with reference to FIG. 4. FIG. 4 is a sequence diagram illustrating a traveling control process executed by the power supply control system according to the embodiment.

First, the control unit 22 of the traveling lane management device 20 determines whether information related to a disaster (hereinafter referred to as disaster information) is received (step S101). The disaster information is distributed, for example, from disaster prevention centers of national and local governments. When the control unit 22 determines that the disaster information has not been received (step S101: No), the control unit 22 repeats the reception confirmation. On the other hand, when the control unit 22 determines that the disaster information has been received (step S101: Yes), the control unit 22 proceeds to step S102. Before the disaster information is acquired, the power supply control (power supply ratio) in the traveling lane is assumed to be in the normal state. That is, the power supply ratio in each traveling lane is equalized.

In step S102, the control information creation unit 21 creates traveling lane control information including the power supply ratio in the travel lane of the disaster area based on the received disaster information. The power supply ratio set here is set such that electric power supplied to the widest traveling lane (for example, the third traveling lane in FIG. 3) is maximized. Here, in the example shown in FIG. 3, for example, the power supply ratio may be set such that the power supply ratio is increased in the order of the first traveling lane 51, the second traveling lane 52, and the third traveling lane 53, or the power supply ratio of the third traveling lane 53 is the largest and the power supply ratios of the first traveling lane 51 and the second traveling lane 52 are the same.

The control unit 22 transmits the traveling lane control information created in step S102 to the power supply management device 40 (step S103). At this time, the traveling lane control information is transmitted to the power supply management device 40 that manages the power supply device 41 in the disaster area.

The power supply management device 40 determines whether the traveling lane control information has been received (step S104). When the control unit 40a determines that the traveling lane control information has not been received (step S104: No), the control unit 40a repeats the reception confirmation of the traveling lane control information. On the other hand, when the control unit 40a determines that the traveling lane control information has been received (step S104: Yes), the control unit 40a proceeds to step S105.

In step S105, the control unit 40a changes the power supply control in each traveling lane in accordance with the traveling lane control information. The control unit 40a controls the ratio of electric power supplied to each traveling lane according to the power supply ratio. As a result, the electric power is preferentially supplied to the third traveling lane 53 that has a largest lane width. At this time, the electric power may not be supplied to an affected traveling lane in which the vehicle 30 does not travel.

With the control of step S105, for example, when an emergency vehicle 30 (vehicle 30L) travels in the widest traveling lane (third traveling lane 53 in FIG. 3) to head for the disaster area, the emergency vehicle 30 can travel under stable power supply.

After that, the control unit 22 determines whether resolution information indicating that the disaster has been settled and trouble caused by the disaster has been resolved has been received (step S106). When the control unit 22 determines that the resolution information has not been received (step S106: No), the control unit 22 repeats the reception confirmation. On the other hand, when the control unit 22 determines that the resolution information has been received (step S106: Yes), the control unit 22 proceeds to step S107.

In step S107, the control unit 22 resets the power supply ratio such that the power supply ratio in each traveling lane is equalized, and transmits, to the power supply management device 40, cancellation information including the set power supply ratio.

The control unit 40a determines whether the cancellation information has been received (step S108). When the control unit 40a determines that the cancellation information has not been received (step S108: No), the control unit 40a repeats the reception confirmation. On the other hand, when the control unit 40a determines that the cancellation information has been received (step S108: Yes), the control unit 40a proceeds to step S109.

In step S109, the control unit 40a returns the power supply ratio to the power supply device 41 in each traveling lane to the normal ratio (here, the power supply ratios are equalized).

In the present embodiment described above, the traveling lane management device 20 controls such that electric power is preferentially supplied to the widest traveling lane when a disaster occurs in a normal state in which electric power is equally supplied to each of the traveling lanes having a different lane width. According to the present embodiment, in the event of a disaster, when the emergency vehicle 30 travels in the widest traveling lane to head for the disaster area or the like, the emergency vehicle 30 can travel under stable power supply. As a result, it is possible to maintain a state in which public vehicles can travel in the event of a disaster or the like.

In the present embodiment, an example in which the vehicle 30 travels by manual driving according to operation of a driver has been described. However, this can be applied to a case in which the vehicle 30 travels by autonomous driving while the traveling lane in which each vehicle 30 travels and the speed at which the vehicle 30 travels are controlled by the traveling lane management device 20.

Modification

Figure 5:
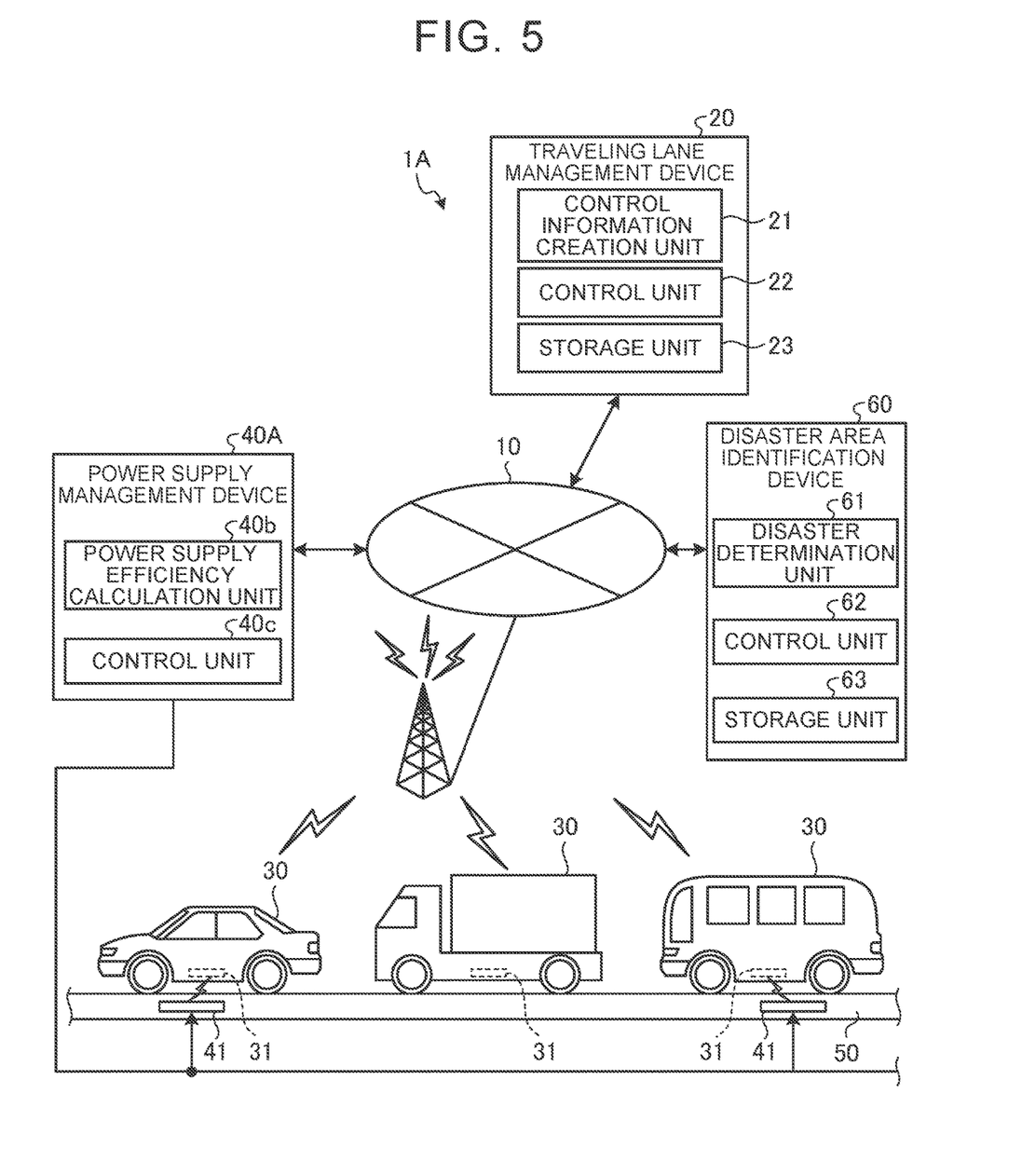
FIG. 5 is a schematic view showing a power supply control system according to a modification.

FIG. 5 is a schematic view showing a power supply control system according to a modification. A power supply control system 1A according to the modification includes a power supply management device 40A instead of the power supply management device 40, and further includes a disaster area identification device 60, for the configuration of the power supply control system 1 according to the embodiment. Hereinafter, parts different from the embodiment (the power supply management device 40A, the disaster area identification device 60, and contents of processes) will be described. In the modification, the power supply management device 40A receives information on SOC associated with time from the communication unit 32 of the vehicle 30.

The power supply management device 40A is connected to the power supply device 41, and the power supply device 41 receives information such as SOC from each vehicle 30 and controls power supply to the vehicle 30. The power supply management device 40A is configured using one or a plurality of computers, etc. including a CPU, FPGA, ROM, RAM, and the like. The power supply device 41 outputs the acquired transmission information to the power supply management device 40A.

Further, the power supply management device 40A includes a power supply efficiency calculation unit 40b and a control unit 40c.

The power supply efficiency calculation unit 40b calculates a power supply rate (power supply efficiency) per unit time based on the SOC acquired from the vehicle 30 to which electric power is supplied. The power supply efficiency calculation unit 40b can adopt a known method for calculating the power supply efficiency.

The control unit 40c comprehensively controls an operation of each unit of the power supply management device 40A.

The disaster area identification device 60 receives information on the power supply efficiency of each vehicle 30 from the power supply management device 40A, determines whether a disaster has occurred at a power supply point based on the received information, and identifies a disaster area. Further, the disaster area identification device 60 transmits disaster information to, for example, a regional center that administers a point in which the disaster area is identified.

The disaster area identification device 60 includes a disaster determination unit 61, a control unit 62, and a storage unit 63. The disaster area identification device 60 is configured using one or a plurality of computers, etc. including a CPU, FPGA, ROM, RAM, and the like.

The disaster determination unit 61 determines whether a disaster has occurred in an area managed by the power supply management device 40A based on the power supply efficiency acquired from the power supply management device 40A.

Here, when sediments are deposited on a traveling lane and the sediments are interposed between the vehicle 30 and the power supply device 41, strength of the electromagnetic wave (transmission efficiency) is lowered, so that the power supply efficiency is lowered due to reduction of the strength. Examples of the sediments include liquids such as water, ice (snow), earth and sand, volcanic ash, and collapsed structures. At this time, a plurality of threshold values may be set according to a degree of decrease in the power supply efficiency, and a degree of disaster may be determined based on each threshold value. When the rate of decrease in the power supply efficiency is different depending on types of sediments, a threshold value may be set for each sediment type. When a threshold value is set according to a sediment type, the disaster determination unit 61 compares the power supply efficiency with each threshold value to determine a category of disaster (for example, flood).

The control unit 62 comprehensively controls an operation of each unit of the disaster area identification device 60.

The storage unit 63 is configured using a computer-readable recording medium, and various programs and various data are stored in a writable and readable manner. The recording medium includes a storage medium such as an optical disk, a flash memory, and a magnetic disk, and a drive device for these storage media.

Further, the storage unit 63 stores a threshold value used when the disaster determination unit 61 determines whether a disaster occurs. The threshold value is, for example, a lower limit value of the power supply efficiency set based on the rate of decrease in the power supply efficiency caused by the sediment. A plurality of the threshold values may be set such that a threshold value is set for each model of the power supply device 41 or a threshold value is set based on the rate of decrease in power supply efficiency caused by the type of sediment. In addition, the strength of the electromagnetic wave may be increased depending on the type of sediment and the like. When it is assumed that the power supply efficiency is abnormally increased due to such a sediment, an upper limit value may be set for the threshold value, and the disaster determination unit 61 may determine that a disaster has occurred when the threshold value exceeds the upper limit value.

Figure 6:
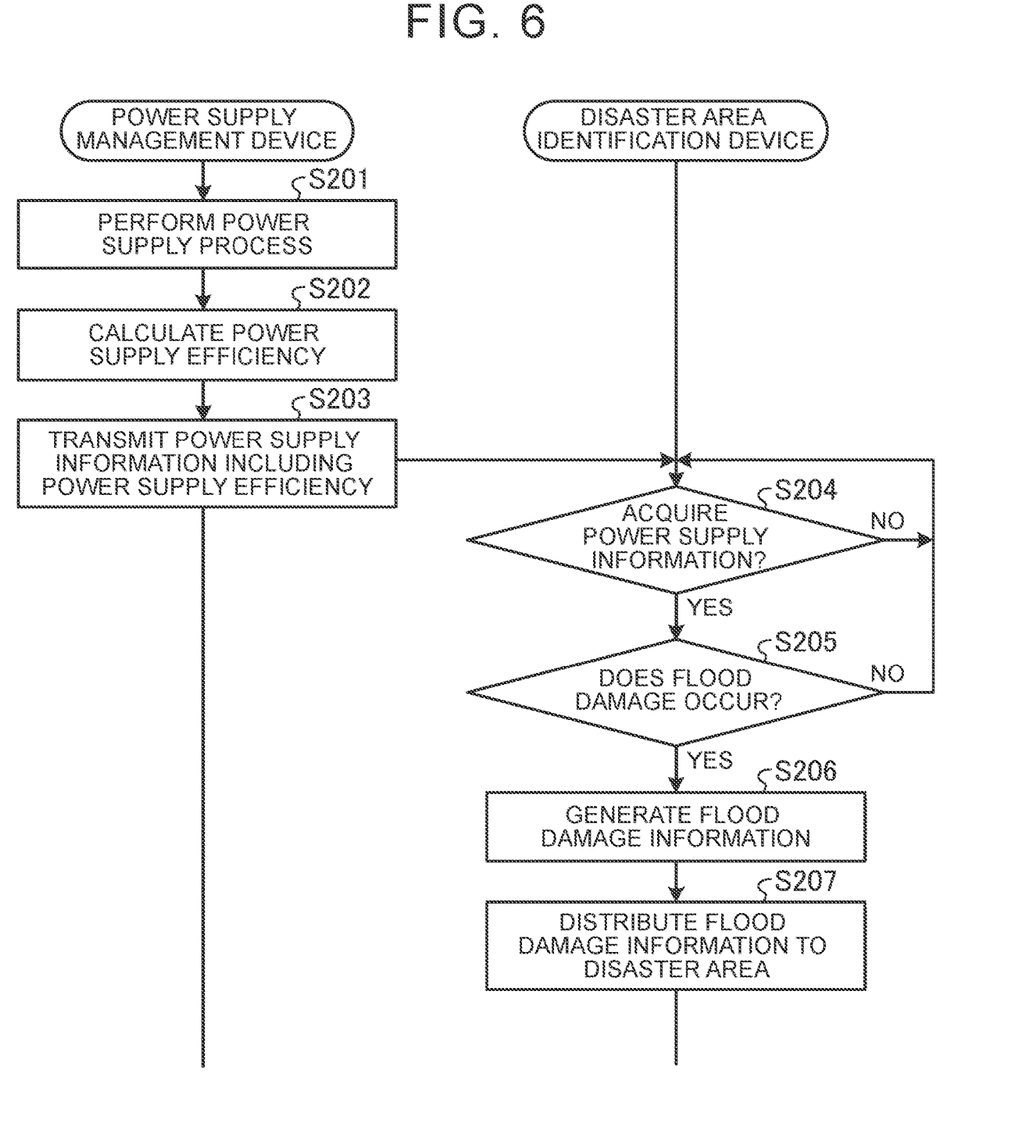
FIG. 6 is a sequence diagram illustrating a disaster determination process executed by the power supply control system according to the modification.

Subsequently, a disaster determination process in the disaster area identification device 60 will be described. FIG. 6 is a sequence diagram illustrating a disaster determination process executed by the power supply control system according to the modification. In FIG. 6, as an example, an example of determining flood damage will be described.

The power supply management device 40A supplies electric power to the power supply device 41 that has detected the vehicle 30 to perform the power supply process from the power supply device 41 to the vehicle 30 (step S201). The power supply management device 40A acquires the SOC at the start of power supply and the time at which the power supply is started, for example, via the power supply device 41. When the power supply management device 40A ends the power supply process, the power supply management device 40A acquires the SOC at the end of power supply and the time at which the power supply is ended, for example, via the power supply device 41. The SOC at the start of power supply and the SOC at end of the power supply may be collectively transmitted to the power supply management device 40A. At this time, when the SOC reaches the upper limit value during power supply, the charging end time is time when the SOC reaches the upper limit value.

After that, the power supply efficiency calculation unit 40b calculates the power supply efficiency (step S202). For example, the power supply efficiency calculation unit 40b acquires, from the vehicle 30 to which electric power is supplied, the SOC at the time immediately before power supply is started and the SOC at the time immediately after power supply is ended. The power supply efficiency calculation unit 40b calculates the power supply rate per unit time (the rate of increase in the SOC) based on each time and SOC that have been acquired, and the obtained rate is set as the power supply efficiency.

The power supply management device 40A transmits power supply information including the calculated power supply efficiency to the disaster area identification device 60 (step S203). In addition to the power supply efficiency, the power supply information includes information regarding a position of the power supply device 41 for which the power supply efficiency is calculated.

The disaster area identification device 60 determines whether the power supply information has been received (step S204). When the disaster area identification device 60 determines that the power supply information has not been received (step S204: No), the disaster area identification device 60 repeats the reception confirmation of the power supply information. When the disaster area identification device 60 determines that the power supply information has been received (step S204: Yes), the disaster area identification device 60 proceeds to step S205.

In step S205, the disaster area identification device 60 determines whether flood damage has occurred based on the power supply efficiency. Specifically, the disaster determination unit 61 determines whether flood damage has occurred in a point managed by the power supply management device 40A based on the power supply efficiency acquired from the power supply management device 40A. Further, the disaster determination unit 61 estimates a flooded area based on the position (point) of the power supply device 41 to be determined.

Specifically, the disaster determination unit 61 compares the power supply efficiency with the threshold value stored in the storage unit 63, and when the power supply efficiency is less than the threshold value, the disaster determination unit 61 determines that a disaster has occurred in the point in which the power supply device 41 to which electric power is supplied is disposed or in an area including the point. Further, the disaster determination unit 61 estimates a disaster area based on a determination result for each power supply device 41. For example, an area is associated with each point in which the power supply device 41 is disposed. When the disaster determination unit 61 determines that a disaster has occurred and a plurality of the power supply devices 41 is disposed in areas where a disaster has occurred, the disaster determination unit 61 sets a disaster area by combining the areas in which the power supply devices 41 are disposed. The disaster area is identified by a determination result of the disaster determination unit 61.

Further, the disaster determination unit 61 may determine whether a disaster has occurred based on the number of the power supply devices 41 having power supply efficiency being lower than the threshold value and continuity. For example, when the disaster determination unit 61 determines that a disaster has occurred regarding the predetermined number or more of the power supply devices 41 among all the power supply devices 41 managed by the power supply management device 40, the disaster determination unit 61 determines that a disaster has occurred in an area managed by the power supply management device 40. Further, when the disaster determination unit 61 determines that a disaster has occurred and the number (continuous number) of the power supply devices 41 disposed adjacent to each other is a predetermined number or more, the disaster determination unit 61 determines that a disaster has occurred in an area managed by the power supply management device 40. "Disposed adjacent to each other" described here means that the power supply devices 41 are disposed adjacent to each other in the same traveling lane or each of the power supply devices 41 is disposed in a traveling lane among a plurality of the traveling lanes and the power supply devices 41 are disposed adjacent to each other at a closest distance.

The disaster area identification device 60 generates flood damage information based on a determination result of the disaster determination unit 61 (step S206). The disaster area identification device 60 generates, as the flood damage information, information including a flooded area determined by the disaster determination unit 61. When a degree of flood damage is determined by the set threshold value, that information is also included in the flood damage information.

The disaster area identification device 60 distributes the flood damage information to the traveling lane management device 20, the regional center that manages a flooded area, and the like (step S207). When the regional center receives the flood damage information, the regional center distributes the information to a subregional center that manages the region, notifies that a flood has occurred by disaster prevention broadcasting, sets a no-traffic area, and stops an operation of the power supply device 41 in the region.

The traveling lane management device 20 performs power supply control in the same manner as in the embodiment for an area where flood damage has occurred (see FIG. 4). Specifically, control in which electric power is preferentially supplied to the widest traveling lane is implemented. At this time, when the vehicle 30 cannot travel because the widest traveling lane is submerged, the electric power is preferentially supplied to the second widest traveling lane. The electric power to be supplied to the submerged traveling lane may be reduced or the electric power may not be supplied (stopped) to the submerged traveling lane.

In the modification described above, as in the embodiment, the traveling lane management device 20 controls such that electric power is preferentially supplied to the widest traveling lane when a disaster occurs in a normal state in which electric power is equally supplied to each of the traveling lanes having a different width. According to the modification, in the event of a disaster, when the emergency vehicle 30 travels in the widest traveling lane to head for the disaster area or the like, the emergency vehicle 30 can travel under stable power supply. As a result, it is possible to maintain a state in which public vehicles can travel in the event of a disaster or the like.

Further, in the modification, it is determined whether a disaster has occurred using the power supply efficiency of non-contact charging that changes depending on presence or absence of sediments interposed between the vehicle 30 and the power supply device 41. According to the modification, by acquiring information from the power supply device 41 that supplies electric power to the vehicle 30, it is possible to estimate whether a disaster has occurred in a location where the power supply device 41 is installed, so that a disaster area can be identified without installing new equipment. This allows a local personnel to identify the occurrence of a disaster without going to a disaster area. Further, as described above, the rate of decrease in the power supply efficiency caused by the sediment may be different depending on the type of sediment. When the difference in the rate of decrease in the power supply efficiency can be used, it is possible to determine a category of disaster such as flood damage or sediment-related disaster and send the disaster information to the relevant region.

Further, in the modification, since a traveling lane affected by a disaster can be identified by installing each power supply device 41, the electric power to be supplied to other traveling lanes can be appropriately allocated and the electric power can be efficiently supplied by reducing or stopping the electric power to be supplied to the affected traveling lane. Further, since the number of vehicles 30 traveling in the affected traveling lane is extremely reduced, the electric power to be wastefully consumed can be reduced by reducing or stopping the electric power to be supplied to the affected traveling lane.

Further, in the modification, the disaster determination unit 61 determines whether a disaster has occurred based on the number of the power supply devices 41 having power supply efficiency being lower than the threshold value and continuity, so that the disaster determination unit 61 can distinguish failure of the power supply device 41 and the occurrence of a disaster to determine whether a disaster has occurred. This allows the disaster determination unit 61 to determine whether a disaster has occurred more accurately.

In the modification, the power supply management device 40A may be configured not to include the power supply efficiency calculation unit 40b, and the disaster area identification device 60 may acquire the information on SOC from the vehicle 30 and the disaster determination unit 61 may calculate the power supply efficiency.

Recoding Medium

According to the embodiment, a program capable of executing a processing method by the power supply control system can be recorded in the recording medium that is readable by a computer or other machines or devices (hereinafter referred to as "computer or the like"). The computer or the like functions as the control units of devices of a disaster specification system as the computer or the like is caused to read the program stored in the recording medium and execute the program. Here, the recording medium that is readable by the computer or the like means a non-transitory recording medium that can accumulate information such as data or programs through electrical, magnetic, optical, mechanical, or chemical action and read the information from the computer or the like. Examples of the recording medium removable from the computer among the recording media above include, for example, a flexible disk, a magneto-optical disk, a compact disc read-only memory (CD-ROM), a compact disc rewritable (CD-R/W), a digital versatile disc (DVD), a Blu-ray disc (BD), a digital audio tape (DAT), a magnetic tape, and a memory card such as a flash memory. In addition, examples of the recording medium fixed to the computer include a hard disk and a read-only memory (ROM). Further, a solid state drive (SSD) can be used as the recording medium removable from the computer or as the recording medium fixed to the computer.

Other Embodiment

In the power supply control system according to the embodiment, the "unit" can be read as a "circuit" or the like. For example, the communication unit can be read as a communication circuit.

The program to be executed by the power supply control system according to the embodiment may be configured to be stored in a computer connected to a network such as the Internet and provided through downloading via the network.

Further effects and modifications can be easily derived by those skilled in the art. The broader aspects of the present disclosure are not limited to the particular details and representative embodiments shown and described above. Accordingly, various modifications may be made without departing from the spirit or scope of the general inventive concept defined by the appended claims and their equivalents.

What is claimed is:

1. A power supply control system, comprising:
a plurality of traveling lanes in which vehicles travel in a same direction, each of the traveling lanes having a different width from each other;
a traveling lane management device including a first processor; and
a power supply control device including a second processor, wherein
the first processor is configured to:
receive first information on a disaster from a disaster prevention center of a national or local government;
generate second information on control for power supply to the plurality of the traveling lanes, in a case where the first processor receives the first information while the vehicles travel in the plurality of traveling lanes, the second information instructing increasing a power supply ratio in a widest traveling lane in the plurality of the traveling lanes; and
transmit the second information to the second processor, and
the second processor is configured to:
receive the second information from the first processor;
increase the power supply ratio in the widest traveling lane in the plurality of the traveling lanes in a case where the second processor receives the second information;

receive third information on the disaster that indicates that the disaster has been settled and a trouble caused by the disaster has been resolved; and return the power supply ratio to a predetermined power supply ratio in a case where the second processor receives the third information.

2. The power supply control system according to claim 1, further comprising a power supply device is installed in each of the traveling lanes and configured to supply electric power to the vehicles.

3. The power supply control system according to claim 2, wherein the power supply device is installed in each of the plurality of traveling lanes.

4. The power supply control system according to claim 1, further comprising:

a power supply device configured to supply electric power to the vehicles under control of the power supply control device; and a disaster area identification device including a third processor configured to determine whether the disaster has occurred at a position where the power supply device is installed, based on power supply efficiency, the power supply efficiency being calculated based on a rate of decrease in the power supply efficiency caused by sediment deposited on the traveling lane.

5. The power supply control system according to claim 4, wherein:

the power supply device installed in each of the traveling lanes; and the third processor is configured to determine that the disaster has occurred at a point where the power supply device supplies the electric power to the vehicles in a case where the power supply efficiency is equal to or less than a preset threshold value.

6. The power supply control system according to claim 5, wherein the third processor is configured to set a plurality of the threshold values according to a category of disaster.

7. The power supply control system according to claim 6, wherein the third processor is configured to determine the category of the disaster based on the power supply efficiency and the threshold values.

8. The power supply control system according to claim 6, wherein the plurality of the threshold values include a lower limit of the power supply efficiency set based on the rate of the decrease in the power supply efficiency, and an upper limit of the power supply efficiency set based on a rate of increase in the power supply efficiency caused by the sediment deposited on the traveling lane, and the third processor is further configured to determine that the disaster has been occurred in a case where the threshold value falls below the lower limit or exceeds the upper limit.

9. The power supply control system according to claim 5, wherein the third processor is configured to determine whether the disaster has occurred based on the power supply efficiency that is reduced by the sediment.

10. The power supply control system according to claim 9, wherein the sediment is at least one of water, ice, snow, earth and sand, volcanic ash, and collapsed structure.

11. The power supply control system according to claim 9, wherein the third processor is further configured to set the threshold values of the power supply efficiency for each sediment type in a case where the rate of the decrease in the power supply efficiency is different depending on types of sediments.

12. The power supply control system according to claim 1, wherein the predetermined power supply ratio is a power supply ratio set before the first processor receive the first information.

13. The power supply control system according to claim 1, wherein the predetermined power supply ratio is same as a power supply ratio of the traveling lanes that is different from the widest traveling lane when the disaster is not occurred.

14. The power supply control system according to claim 1, wherein the predetermined power supply ratio is a power supply ratio equalized in each traveling lane.

15. The power supply control system according to claim 1, wherein the predetermined power supply ratio is a power supply ratio in a normal state, the normal state being a state in which traveling of the vehicles is not hindered by an accident or a disaster.

* * * * *